United States Patent [19]

Farr

[11] 4,217,526
[45] Aug. 12, 1980

[54] D.C. MOTOR SPEED CONTROLLER

[75] Inventor: James B. Farr, Ann Arbor, Mich.

[73] Assignee: Tecumseh Products Company, Tecumseh, Mich.

[21] Appl. No.: 908,288

[22] Filed: May 22, 1978

[51] Int. Cl.² .............................................. H02P 5/06
[52] U.S. Cl. ...................................... 318/139; 318/341
[58] Field of Search ................................. 318/139, 341

[56] References Cited

U.S. PATENT DOCUMENTS

| | | | |
|---|---|---|---|
| 3,855,520 | 12/1974 | Stich | 318/139 X |
| 3,883,786 | 5/1975 | McNaughton et al. | 318/341 X |
| 3,911,341 | 10/1975 | Carlson et al. | 318/341 |
| 3,936,707 | 2/1976 | Yoshida et al. | 318/139 |
| 3,950,681 | 4/1976 | Kern | 318/139 |

Primary Examiner—J. V. Truhe
Assistant Examiner—W. E. Duncanson, Jr.
Attorney, Agent, or Firm—Albert L. Jeffers

[57] ABSTRACT

A direct current, variable duty cycle control circuit for the manual control of the supply of power from a direct current source to a motor is disclosed including a transistor arrangement operable when enabled to couple the direct current source to the motor along with means for enabling that transistor arrangement during an operator determinable portion of each of a series of time intervals and a sensing circuit receptive to an overload condition of the transistor arrangement for disabling that transistor arrangement. The disclosed system includes an operator control member effective in a first position to prevent the energization of the motor by preventing the supply of electrical power to the control circuit, effective in a second series of positions to vary the portion of each time interval during which the motor is supplied power and effective in a third position to deliver power continuously to the motor by bypassing the transistor arrangement.

14 Claims, 3 Drawing Figures

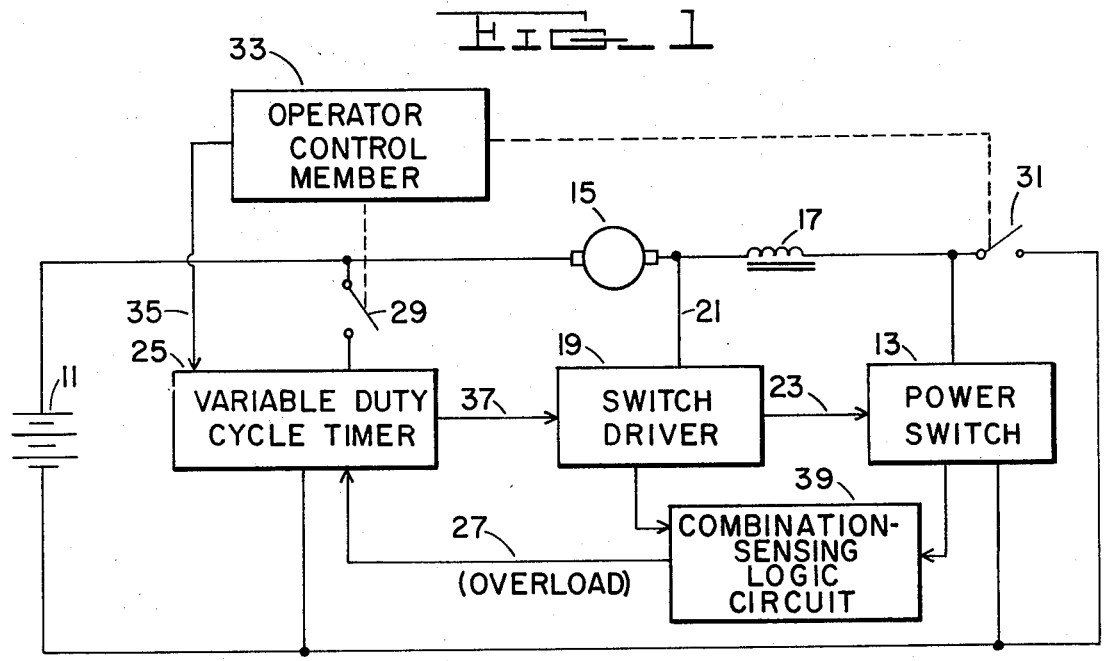
FIG_1
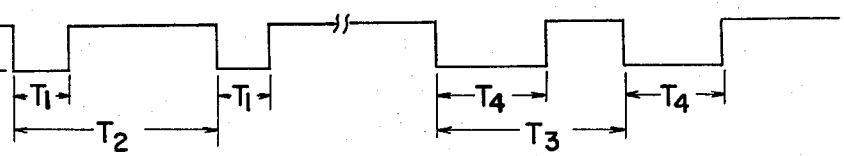
FIG_2

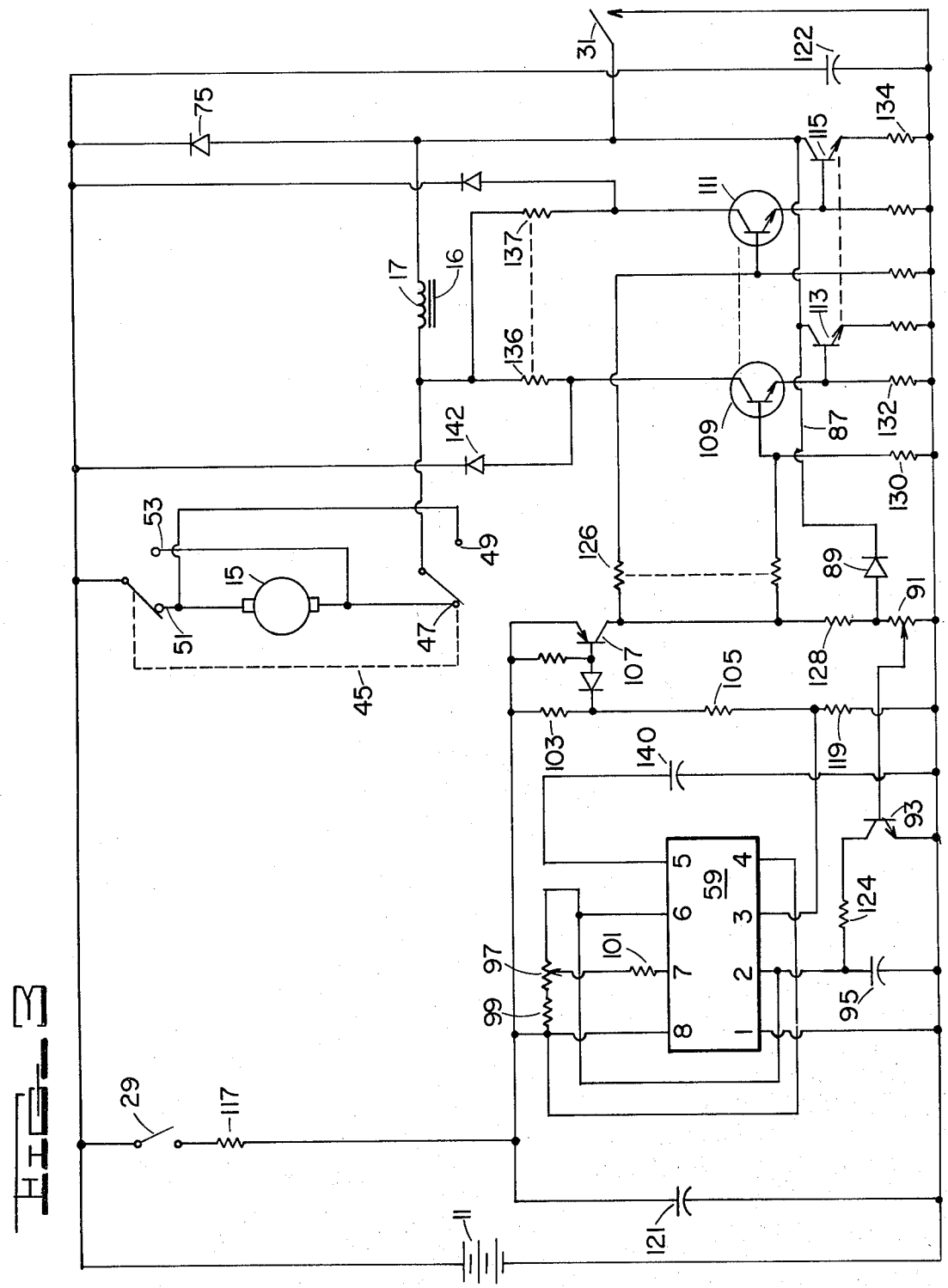

D.C. MOTOR SPEED CONTROLLER

BACKGROUND OF THE INVENTION

The present invention relates generally to direct current motor control circuitry and more particularly to a solid state motor speed control circuit which varies the motor speed by varying the duty cycle of the voltage applied to the motor.

Basic motor speed control circuits have in the past employed a fixed direct current voltage source with a variable resistance in series with, for example, the motor armature, so that an operator might vary the series resistance thereby also varying the voltage applied to the motor armature and therefore also the motor speed. This series variable resistor arrangement provides adequate speed control, however, particularly at reduced speeds, substantial $I^2R$ losses occur in the series variable resistance, resulting in substantially reduced efficiency of the system. In installations employing a rechargeable storage battery, such as an electrically powered golf cart or forklift truck, a large fraction of the energy consumed by the system is dissipated as heat from the series control resistor and the elimination of this heat loss would provide for either a substantial increase in the operating time between recharging sessions or a substantial reduction in the size of the storage battery required while maintaining the operating time between battery chargings substantially the same.

In addition to the inefficiency and heat dissipating problems, such series resistance controls are plagued with electro-mechanical contact problems including the service and maintenance problems associated therewith. Motor overload protection circuitry is difficult or expensive to incorporate and the frequent recharging of the energy source shortens the life of that source. Despite these problems, the series control resistor is still commercially employed because of its relatively low initial cost.

Various attempts have been made to avoid the foregoing disadvantages of series resistance control arrangements by, for example, electronically controlling the duty cycle of energy supplied to a motor. Such electronic controls may, for example, employ a silicon controlled rectifier in series with the motor armature and selectively gate that silicon controlled rectifier to conduct during selectable portions only of repeated time intervals. These prior art duty cycle motor controllers have not met with great commercial success, due in part to their relatively high initial cost and lack of overload protection for the control circuit elements.

SUMMARY OF THE INVENTION

Among the several objects of the present invention may be noted the provision of a solid state direct current motor speed control circuit characterized by its reduced cost, improved operating efficiency, and high reliability; the provision of a motor control circuit employing solid state switching of the motor armature current where the drive for the solid state switching arrangement is derived from the voltage across the field of the motor; the provision of circuitry for manually controlling the power supplied from a direct current source to a motor including circuitry for sensing an overload condition and for interrupting the power supply in response thereto; the provision of a solid state motor speed control circuit including a single operator control member which, in a first position, prevents motor operation by precluding energization of the control circuit which, in a second series of continuous or discrete positions, functions to vary the proportion of successive time intervals during which power is supplied to the motor, and which, in a third position, bypasses the control circuitry to continuously directly energize the motor; and the provision of a solid state motor control circuit of generally improved operating characteristics.

In general, and in one form of the invention, circuitry for the manual control of the power supplied from a source to a motor includes a transistor switching arrangement which is operable when enabled to couple the source to the motor along with means for enabling that transistor switching arrangement during selectively determinable portions of each of a series of time intervals and includes circuitry for disabling the transistor arrangement in response to an overload condition of that transistor arrangement. Manual control is achieved by a single operator control member which is effective in a middle range of positions to determine the portion of each time interval while, in one extreme position, the transistor enabling circuitry is disabled and in the other extreme position the transistor switching arrangement is short-circuited or by-passed to supply power directly from the source to the motor.

Also in general, and in one form of the invention, a motor speed control circuit includes a direct current source, the motor armature, the motor field winding, and a power transistor switching arrangement connected in series along with a driver transistor arrangement for enabling the power transistor arrangement during controllable portions of successive time intervals and circuitry for limiting the collector-emitter voltage of the driver transistor arrangement to less than the voltage of the source by at least the voltage across the motor armature.

BRIEF DESCRIPTION OF THE DRAWINGS

FIG. 1 is a block schematic diagram of a direct current motor speed control arrangement in one form of the invention;

FIG. 2 is a wave form illustrating the voltage output from the variable duty cycle timer during two different illustrative conditions; and FIG. 3 is a detailed schematic diagram of one implementation of the speed control circuit of FIG. 1.

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Referring first to FIG. 1, the direct current motor speed control arrangement of the present invention is seen to include in general a direct current source such as a rechargeable storage battery 11 and a power switch 13 which may, for example, be a transistor arrangement which is operable when enabled to couple the source 11 to a direct current motor which, as illustrated, comprises the series combination of the motor armature 15 and the motor field winding 17. The switching arrangement 13 is enabled during a selectively determinable portion of each of a series of time intervals by a switch driver circuit 19 which has its voltage between lines 21 and 23 limited to less than the voltage of the source 11 by at least the voltage drop across the motor armature 15. The switch driver in turn is enabled for the selectively determinable portions of the successive time intervals by a variable duty cycle timer 25. Any overload condition, as indicated by an excessive voltage drop across the power switching arrangement 13 combined with the switch driver being in an activated state is indicated by a signal on line 27, which signal is effective to interrupt operation of the timer 25. The combination of excessive voltage across the power switch and driver in the conductive state is sensed by logic circuit 39. Closure of the switch 29 provides a voltage source for timer 25, while closure of switch 31 effectively short-circuits or bypasses the solid state power switching arrangement 13, connecting armature 15 and field winding 17 directly in series with the battery 11.

An operator control member 33, which might in an exemplary environment, such as a battery powered golf cart, take the form of an operator accessible foot-actuated accelerator pedal, functions upon initial depression by a slight amount to close switch 29 and functions when fully depressed to close also switch 31. Such a pedal may be spring loaded to return to the position where both switches 29 and 31 are open, if the operator, for example, removes his foot from the pedal. In intermediate positions of the operator control member, a representation of the degree of depression is supplied by way of line 35 to the variable duty cycle timer 25, with various positions of that operator control member varying the duty cycle of the timer. Thus, the operator control member might be coupled to a potentiometer with depression of the control member varying the resistance of that potentiometer.

FIG. 2 depicts two exemplary output wave forms supplied from the variable duty cycle timer 25 to the switch driver 19 by way of line 37. During the first (left) portion of the timer output wave form, a time interval or cycle is represented by $T_2$, and during this interval, driver 19 is enabled for the portion of the time interval represented by $T_1$ with the duty cycle being by definition $T_1$ divided by $T_2$. So long as the potentiometer setting remains constant, this output on line 37 continues with the total cycle time of $T_2$ and with the switch driver periodically enabled during the time interval $T_1$. If the potentiometer setting is changed to a new value, the wave form on line 37 may become as depicted further toward the right in FIG. 2, with a period $T_3$, during which an "on time" of $T_4$ occurs. The duty cycle is now $T_4$ divided by $T_3$. The repetition rates associated with $T_2$ and $T_3$ may be substantially the same or may vary somewhat with variations in the potentiometer setting depending on the particular circuitry employed and minor variations in this period or repetition rate have no substantial effect on circuit operation since the important feature is the ratio of driver "on time" to the total time interval. Also while the enabling signal in FIG. 2 has been depicted as a negative going pulse, either positive or negative logic may be employed in any particular implementation. Further, while the wave form of FIG. 2 depicts only two different duty cycles, the timer may be arranged to provide duty cycle signals varying from zero or nearly zero to one or nearly one, depending upon the particular setting in which the time proportioning control circuit is used.

Turning now to the more detailed time proportioning control circuit schematic diagram of FIG. 3, switch 29 is initially closed upon operator actuation of the operator control member to supply voltage from battery 11 to the variable duty cycle timing circuitry. This operator control member varies the position of the wiper on potentiometer 97 through its range and at the other extreme of the operator control member movement, switch 31 is closed to directly connect the battery 11, armature 15 and field winding 17 in series. The closure of switch 31 of course occurs to obtain a duty cycle equal to one and represents full motor speed. A separate operator control may be provided for changing the double pole double throw switch 45 from the position shown so as to connect to contact 49 on the one hand and contact 53 on the other hand to provide for reversing the direction of motor rotation.

For intermediate positions of the operator control member, that is, positions through which the potentiometer 43 is varied after the closure of switch 29 and prior to the closing of switch 31, current flows from the battery 11 through armature 15 and field winding 17, through the parallel connected transistor array, of which only units 113 and 115 are shown, to complete the circuit back to battery 11.

The transistor array represented by 113 and 115 is enabled to conduct only during portions of successive time intervals with the duty cycle for that portion determined by the particular setting of potentiometer 97.

The timing circuitry of FIG. 3 is built around a commercially available integrated circuit 59 which operates as an astable mutivibrator providing an output (as illustrated in FIG. 2) by way of resistor 105 to the base of the transistor 107. The duty cycle of the enabling signal supplied through resistor 105 is numerically the ratio of the resistance between pins 6 and 7 on integrated circuit 59 to the sum of the resistance between pins 7 and 8 plus twice the resistance between pins 6 and 7. This integrated circuit 59 is a NE555.

The timer output as supplied to the base of transistor 107 goes "low" during the enabling portion of the duty cycle causing transistor 107 to conduct. Conduction by transistor 107 supplies a base enabling current to Darlington transistors of the driver array represented in FIG. 3 by Darlingtons 109, 111, rendering them conductive. The source of current for the high base current drive required by the output transistors in the parallel array represented by 113, 115 in FIG. 3 is provided by the low voltage dropped across the motor field 17. This method of supplying base drive is advantageous in that it supplies base current drive in proportion to load current, and from a low voltage source consisting of the drop across field 17, thus minimizing the power consumed by the base drive circuit. Aso, at high motor current, the magnetic circuit 16 of the motor may saturate if all of the armature current is allowed to pass through the field, so that shunting a fraction of the current into the driver circuit as in FIG. 3 will not result in a significant decrease in the flux density of field 17. Rendering of the driver array 109-111 conductive allows current through resistor array 136-137 and to the base terminals of output array 113-115 via the emitters of driver array 109-111. Current into the base terminals of output transistors 109-111 is established as equal values from one unit to the next by resistor array 136-137. Thus, with substantially equal base currents, the output transistors will share the load current in proportion to their gain. Since the gain of the output transistors does not vary substantially at high currents, the load current division within array 113-115 is good. Conduction by the output transistors in turn causes a rise in field and armature current. When the output from timer circuit 59 goes "high", transistor 107 is turned off, interrupting current to the bases of driver array 109-111 and thereby also turning off output array 113-115. The sudden cessation of current in the output transistors causes a stepped conduction in diode 75 so as to maintain a continuity of current in field 17 and armature 15.

adjustment of potentiometer or variable resistor 91, and the total voltage drop across that resistor increases as the potential on line 87 increases. Thus, for some choices of circuit parameters and certain settings of the potentiometer 91, diode 89 may still be conducting when the potential at the base of transistor 93 becomes sufficient to cause that transistor to conduct. In either event, overload protection is effectively provided.

Component values and a brief comment as to the component function for the circuit are as follows:

| Component | Value | | Function |
|---|---|---|---|
| 122 | 2000 μf | | Voltage suppression and load-line improvement for transistors 109, —, 111. |
| 117 | 220 ohm 4w | | Forms power supply for drive oscillator 59. |
| 119 | 120 ohm 2w | | Acts as dummy load on power supply during the "off" period to maintain near constant voltage on capacitor 121 without expense of a zener diode. |
| 99 | 1000 ohm | | Timing function; resistor 97 is connected to vehicle accelerator pedal. |
| 97 | 25000 ohm | Pot. | |
| 101 | 1000 ohm | | |
| 124 | 1000 ohm | | Limits discharge current from timing capacitor 95. |
| 103 | 2200 ohm | | Bypass of emitter-base of transistor 107 for leakage control. |
| 105 | 4700 ohm | | Base drive for transistor 107. |
| 126 | 510 ohm | | Base drive for Darlington transistor 111. |
| 128 | 4700 ohm | | Drives transistor 93 when diode 89 is reverse biased. |
| 91 | 5000 ohm | Pot. | Controls trip level of protection circuit. |
| 130 | 2200 ohm | | Leakage bypass. |
| 132 | 10 ohm | | Leakage bypass. |
| 134 | lead resistance about .002 ohm | | Aid in dividing collector currents. |
| 136 | 1.0 ohm | | Dropping resistor - also assures equal base currents for output transistors. |
| 95 | 0.33 μf | | Timing capacitor. |
| 140 | .05 μf | | Noise suppression for the NE555. |
| 93 | 2N5128 | | Part of feedback, protection loop. |
| 107 | 2N4354 | | Intermediate stage. |
| 109 | Darlington | | Driver for output transistor 113. |
| 113 | 2N5575 | | Output transistor, 80 amp continuous, 100 amp peak rating. |
| 142 | 6 amp diode, 100 volt | | Freewheel diode for portion of armature current which goes through base-drive Darlington 109. |
| 75 | High current diode | | Freewheel diode for field and armature current. |

Suppose now that the circuit of FIG. 3 is operating at a relatively high duty cycle with transistor array 109-111 conducting most of the time but that the operator control member has not been moved quite far enough to close switch 31. Suppose further that the collector-emitter voltage drop across transistors 113-115 becomes larger than some specified value indicating excessive current flow through those transistors and an overload condition. With the hypothesized overload, the voltage on line 87 exceeds some specified value, reverse biasing diode 89 so that that diode no longer conducts when transistor 107 conducts. This in turn causes an increased current flow through the variable resistor 91, in turn increasing the voltage level at the base of transistor 93, rendering that transistor conductive. When transistor 93 conducts, it essentially prevents the accumulation of any charge on capacitor 95, which is the timing capacitor for the integrated circuit 59. Hence, the short-circuiting of capacitor 95 renders the timing circuit 59 inoperative, precluding the further enablement of the power transistors 109-111 and obviating the overload condition. The level on line 87 at which transistor 93 conducts is of course set by From the foregoing it is now apparent that a novel arrangement for controlling the energy supplied from a direct current source to a motor has been disclosed meeting the objects and advantageous features set out hereinbefore as well as others and that modifications as to the precise arrangements and details may be made by those having ordinary skill in the art without departing from the spirit of the invention or the scope thereof as set out by the claims which follow.

What is claimed is:

1. Circuitry for manually controlling the energy supplied from a D.C. source to a motor comprising:
   transistor means operable when enabled to couple the source to the motor;
   means for enabling the transistor means during a selectively determinable portion of each of a series of time intervals including an astable mulivibrator having a duty cycle determining resistance-capacitance network; and
   means for sensing an overload condition of the transistor means and for disabling the transistor means to preclude current flow therethrough in response thereto, the means for sensing effectively short-circuiting the network capacitance when the voltage drop across the transistor means exceeds a preselected value during said determinable portion of a time interval.

2. The circuitry of claim 1 wherein the means for sensing senses the voltage drop across the transistor means and includes circuitry for preventing transistor enablement by the means for enabling when the voltage drop exceeds a preselected value during a said determinable portion of a time interval.

3. The circuitry of claim 1 wherein the network resistance is operator variable.

4. The circuitry of claim 1 wherein the means for sensing includes a transistor biased to conduct and thereby effectively short-circuit the network capacitance only when both the voltage drop across the transistor means exceeds the preselected value and the transistor means is enabled.

5. The circuitry of claim 4 wherein the transistor means comprises a plurality of substantially identical transistors with their respective collector-emitter circuits connected in parallel and with the parallel combination thereof forming a series link between the source and the motor.

6. The circuitry of claim 5 further including a plurality of driver transistors, one for each of the plurality of transistors comprising the transistor means, each driver transistor when enabled to conduct supplying a base drive current to a corresponding transistor in the transistor means.

7. The circuitry of claim 1 further comprising means for limiting the enabling current supplied to the transistor means during the determinable portion of each time interval.

8. In a battery powered vehicle, a time proportioning control circuit for delivering electrical energy from the battery to a D.C. vehicle drive motor during an operator controllable portion of each of a sequence of time intervals including a controllable timer, switching transistor means comprising a plurality of substantially identical switching transistors with their respective collector-emitter circuits connected in parallel in series between the battery and drive motor and effective when enabled to supply direct current to the motor, means controlled by the timer for enabling the switching transistor means during the controllable portion of each successive time interval comprising a plurality of driver transistors, one for each of the plurality of switching transistors, each driver transistor when enabled to conduct supplying a limited base drive current to a corresponding switching transistor, the collector-emitter voltage of each driver transistor being limited to a value which is less than the battery voltage by at least the voltage across a portion of the drive motor to thereby provide a base drive current to each corresponding switching transistor which is proportional to the current drawn by the motor, and an operator control member effective in a first position to preclude motor energization by preventing the supply of enabling electrical energy to the control circuit, effective in a second series of positions to vary the said portions of each time interval, and effective in a third position to close switch contacts to circumvent the control circuit and to deliver electrical energy continuously directly from the battery to the motor.

9. The time proportioning control circuit of claim 8 wherein movement of the operator control member through the second series of positions varies the duty cycle of the controllable timer.

10. The time proportioning control circuit of claim 9 wherein the operator control member in the third position closes a switch which bypasses the switching transistor means and in the first position opens a switch to disable the timer.

11. In a direct current series motor speed control circuit having power transistor means, a direct current source, the motor armature, and the motor field winding connected in series, the improvement comprising driver transistor means for enabling the power transistor means during controllable portions of successive time intervals, means for limiting the collector-emitter voltage of the driver transistor means to less than the voltage of the direct current source by at least the voltage across the motor armature, an astable multivibrator timer for defining the sequence of successive time intervals and an operator variable duty cycle within each time interval, the astable multivibrator having a duty cycle determining resistance-capacitance network with the duty cycle corresponding to the portion of the successive time intervals during which the power transistor means is enabled, means for sensing an overload condition of the power transistor means, and means for effectively short-circuiting the network capacitance when the voltage drop across the power transistor means exceeds a preselected value during the duty cycle.

12. The improvement of claim 11 wherein the power transistor means comprises a plurality of substantially identical power transistors with their respective collector-emitter circuits connected in parallel.

13. The improvement of claim 12 wherein the driver transistor means comprises a plurality of driver transistors, one for each power transistor, each driver transistor, when enabled to conduct, supplying a base drive current to the corresponding power transistor.

14. The improvement of claim 11 wherein the network resistance is operator variable to vary the duty cycle.

* * * * *